(12) United States Patent
Sharma et al.

(10) Patent No.: US 8,396,466 B2
(45) Date of Patent: Mar. 12, 2013

(54) CONTENT SYNCHRONIZATION BETWEEN ELECTRONIC DEVICES

(75) Inventors: Ranjan Sharma, New Albany, OH (US);
Shengqiang Wang, Raleigh, NC (US)

(73) Assignee: Alcatel Lucent, Paris (FR)

( * ) Notice: Subject to any disclaimer, the term of this patent is extended or adjusted under 35 U.S.C. 154(b) by 1401 days.

(21) Appl. No.: 11/823,686

(22) Filed: Jun. 28, 2007

(65) Prior Publication Data

US 2009/0005116 A1 Jan. 1, 2009

(51) Int. Cl.
*H04M 3/00* (2006.01)
(52) U.S. Cl. ............. 455/420; 455/418; 455/414.4; 455/557; 455/41.2; 455/550.1
(58) Field of Classification Search .......... 455/418–420, 455/557, 41.2
See application file for complete search history.

(56) References Cited

U.S. PATENT DOCUMENTS

| | | | |
|---|---|---|---|
| 6,341,372 B1* | 1/2002 | Datig .................. | 717/136 |
| 7,103,355 B2* | 9/2006 | Chandnani et al. ........ | 455/418 |
| 7,373,140 B1* | 5/2008 | Matsumoto ............. | 455/414.4 |
| 7,925,250 B2* | 4/2011 | Redpath ................ | 455/420 |
| 2006/0136520 A1* | 6/2006 | Leppinen et al. ......... | 707/204 |
| 2006/0224640 A1* | 10/2006 | Yuan et al. ............. | 707/203 |
| 2007/0149184 A1* | 6/2007 | Viegers et al. ........... | 455/422.1 |
| 2008/0168292 A1* | 7/2008 | Freedman .............. | 713/375 |

* cited by examiner

*Primary Examiner* — Sharad Rampuria
(74) *Attorney, Agent, or Firm* — Fay Sharpe LLP

(57) ABSTRACT

A method is provided for transferring content between a first mobile device (10) and a second mobile device (20). The method includes: internally storing the content on the first mobile device (10) using a first data representation for the internally stored content on the first mobile device (10); establishing a common syntax and associated semantics for describing the content; creating a first external manifest (16) on the first mobile device (10) from the internally stored content on the first mobile (10), the first external manifest (16) employing the common syntax and associated semantics to describe the content; transferring the content from the first external manifest (16) to a second external manifest (26) created on the second mobile device (20), the second external manifest (26) also using the common syntax and associated semantic to describe the content; and, internally storing the content on the second mobile device (20) using a second data representation for the internally stored content on the second mobile device (20).

14 Claims, 2 Drawing Sheets

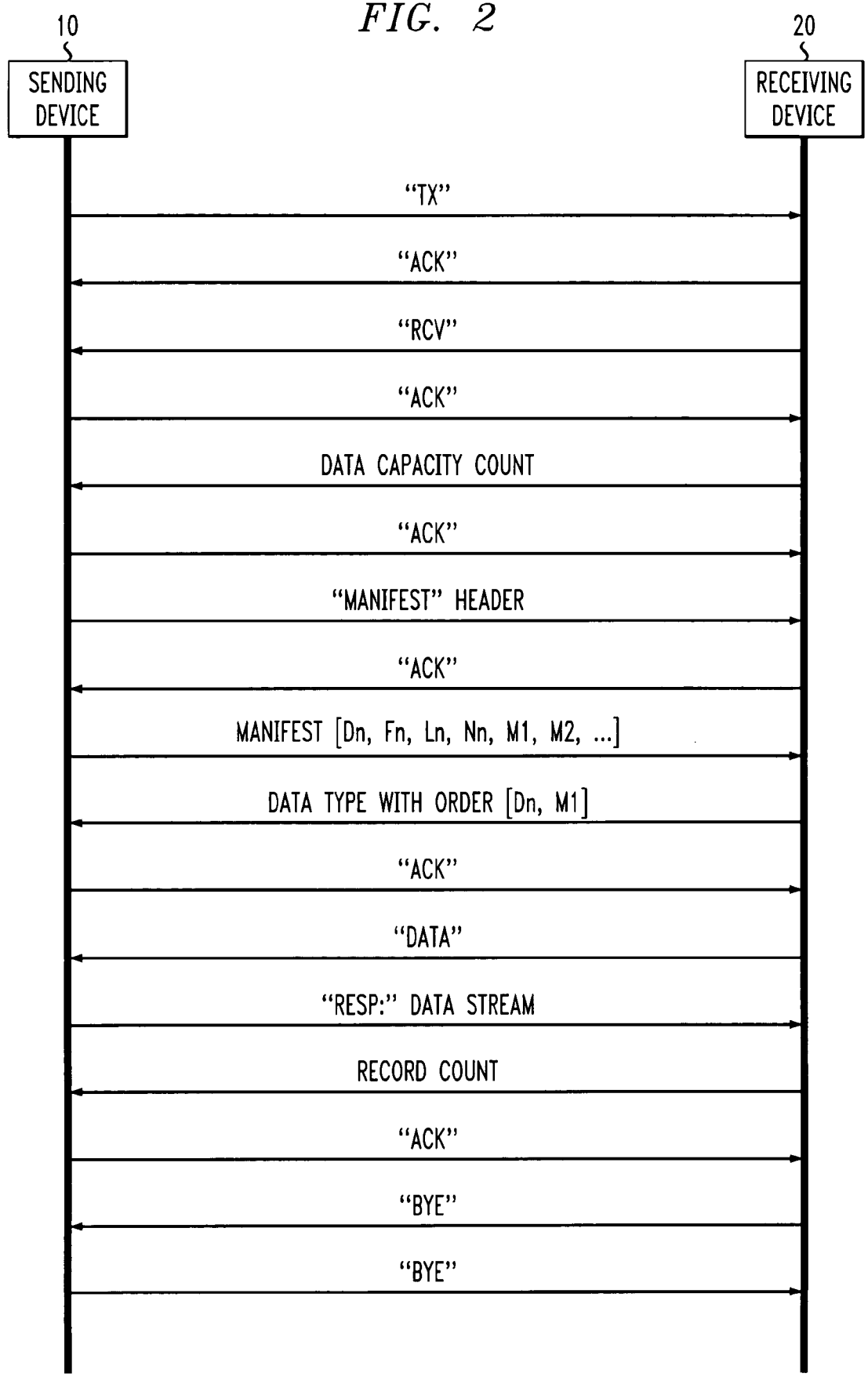

CONTENT SYNCHRONIZATION BETWEEN ELECTRONIC DEVICES

FIELD

The present inventive subject matter relates to the art of electronic devices. Particular application is found in conjunction with certain types of mobile electronic devices, and the specification makes particular reference thereto. However, it is to be appreciated that aspects of the present inventive subject matter are also amenable to other like devices and/or applications, e.g., non-mobile device.

BACKGROUND

Various types of mobile electronic devices are generally known in the art. Cellular or wireless or mobile telephones, smart phones, personal digital assistants (PDAs), etc. are common examples of such mobile devices. It is customary for a mobile device to be equipped with a memory or other data storage element in which information, data and/or various contents are maintained. More specifically, typical mobile devices are often provisioned, for example, with a contact list, address book or the like in which names, telephone numbers, street addresses, e-mail addresses and/or other information regarding various individuals or other contacts are stored.

On occasion, a user may desire to synchronize, transfer, upload or otherwise send content from one mobile device to another. For example, when acquiring a new mobile telephone, a user may desire to transfer the contact list from the old mobile telephone to the new one. In another example, a user may desire to synchronize the contact list on their mobile phone with the contact list on their PDA in order to keep the relevant information up to date. However, prior art solutions implemented to execute this task can be undesirable for one reason or another.

In one prior art example, a user may have to manually enter the information or data into the mobile device receiving the content. More specifically, the user would simply enter the new or updated data manually into the contact list of the mobile device, e.g., using the keypad or other input device equipped on the mobile device. However, this can be an overly time consuming and/or painstaking process that is prone to errors due to mistaken user input, particularly if there are many entries to be made. Moreover, due to size constrains, many mobile devices are often equipped with limited input devices, e.g., as compared to a standard or full keyboard. This can make manual data entry all the more undesirable.

In another conventional example, when a user purchases or otherwise acquires a new mobile telephone, the telephone seller or provider may provide a service whereby the contact list from the old mobile phone is transferred to the new mobile phone while the user waits. However, this contact list transfer service is often not offered when a user switches between different wireless service providers and may not be available for all types or models of mobile devices. Additionally, to avail one's self of this service, the user is generally required to have the old mobile phone with them when the new mobile phone is purchase or acquired, which may not always be the case, or they may be required to return to the point of purchase or other authorized service center at a later time with both mobile devices; this is especially true since the new device may have to be charged for several hours prior to being operative in order to begin the transfer of data. As can be appreciated, such a return trip may be inconvenient for the user. Moreover, this type of contact list transfer service is generally only available for transfers between specific mobile telephones. Accordingly, a user would not, e.g., be able to synchronize contact information between a PDA and a mobile phone using this service. Also, certain new mobile devices or phones may be completely incompatible for data transfer purposes with older devices the user may possess.

Generally, a straightforward transfer of contact list/address book data between mobile devices is hindered by the fact that different mobile device, e.g., from different manufactures, have different ways and/or formats for the internal representation and/or storage of the relevant data and there is generally no well adhered to standard for data storage and/or the representation of contact list data on mobile devices. Rather, manufactures typically try to devise the most efficient way to store the contact list data on the mobile devices, and data access generally follows the same strict constrains.

Additionally, different mobile devices may have different kinds of data stored in each entry or record of the contact list, e.g., depending on the mobile devices capabilities and/or the manufacture's desire. That is to say, one mobile device may support a rather rudimentary set of data in its contact list for each entry or record, e.g., a contact name and a contact number, while on the other hand another mobile device may support a more extensive set of data in its contact list for each entry or record, e.g., a contact name, multiple contact numbers, a speed dial designation, a group designation, a ring tone selection, an associated image designation, etc. Additionally, other mobile devices may further split the contact name into separate fields, such as a first name and a last name. Accordingly, as can be appreciated, different mobile devices commonly employ different internal data structures for their contact lists and/or different internal representations of the contact list data, e.g., which is often driven by the different capabilities of the mobile devices.

To address the aforementioned inconsistencies between different mobile devices, external "data converter" programs or applications, e.g., available on the Internet, have been developed. These data conversion programs attempt to solve the inconsistency problem by providing conversion routines that are operable for a particular pair of mobile devices (i.e., a specific source device and a specific destination device) and apply data transformations specially designed for the identified pair of mobile devices so that the specific destination device is able to recognize and/or accept the contact list data from the specific source device. The drawback here is that unless a user can locate the particular source device and destination device pair, the routine generally cannot be used. As a multitude of various new types and/or models of mobile devices are introduced and/or created by different manufactures on a fairly regular basis, relying on these types of data converters is a limited option. Moreover, as manufactures may consider their own newly developed internal data structures and/or data representations to be proprietary or secret, they may be unwilling or hesitant to release the specifications of the data structures and/or data representations to those that would develop appropriate data converters for the respective mobile device employing these data structures and/or data representations for their contact list data. Accordingly, the development and/or availability of a suitable contact list data converter may be prohibited, delayed or otherwise hindered. Additionally, using Internet based data converters represents a security risk to the extent that a user's contact list data may be exposed to unauthorized or otherwise unwanted tapping by the provider of the converter or while it is being transmitted over the Internet.

Accordingly, a new and improved method for synchronizing content between mobile devices is disclosed that overcomes the above-referenced problems and others.

SUMMARY

In accordance with one embodiment, a method is provided for transferring content between a first mobile device and a second mobile device. The method includes: internally storing the content on the first mobile device using a first data representation for the internally stored content on the first mobile device; establishing a common syntax and associated semantics for describing the content; creating a first external manifest on the first mobile device from the internally stored content on the first mobile, the first external manifest employing the common syntax and associated semantics to describe the content; transferring the content from the first external manifest to a second mobile device using an external manifest created on the second mobile device, the second external manifest also using the common syntax and associated semantic to describe the content; and, internally storing the content on the second mobile device using a second data representation for the internally stored content on the second mobile device.

In accordance with another embodiment, a method is provided for transferring content from a first mobile device to a second mobile device. Suitably, the content includes a plurality of different types of data elements, each particular data element having a particular value, wherein the content is stored internally on the first mobile device using a first device-specific internal data representation and the content is stored internally on the second mobile device using a second device-specific internal data representation. The method includes: establishing a plurality of commonly recognized labels for identifying the different types of data elements; communicating from the first mobile device to the second mobile device a first list containing one or more of the commonly recognized labels, wherein the labels contained in the first list indicate which types of data elements are available for transfer from the first mobile device to the second mobile device; communicating from the second mobile device to the first mobile device a second list containing one or more labels selected from the first list, the selected labels contained in the second list indicating which types of data elements are to be transferred from the first mobile device to the second mobile device; and, transferring from the first mobile device to the second mobile device the values of those data elements identified by the selected labels contained in the second list.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

FIG. 2 is a pillar-post type diagram illustrating a data transfer protocol in accordance with aspects of the present inventive subject matter.

DETAILED DESCRIPTION OF PREFERRED EMBODIMENTS

Figure 1:
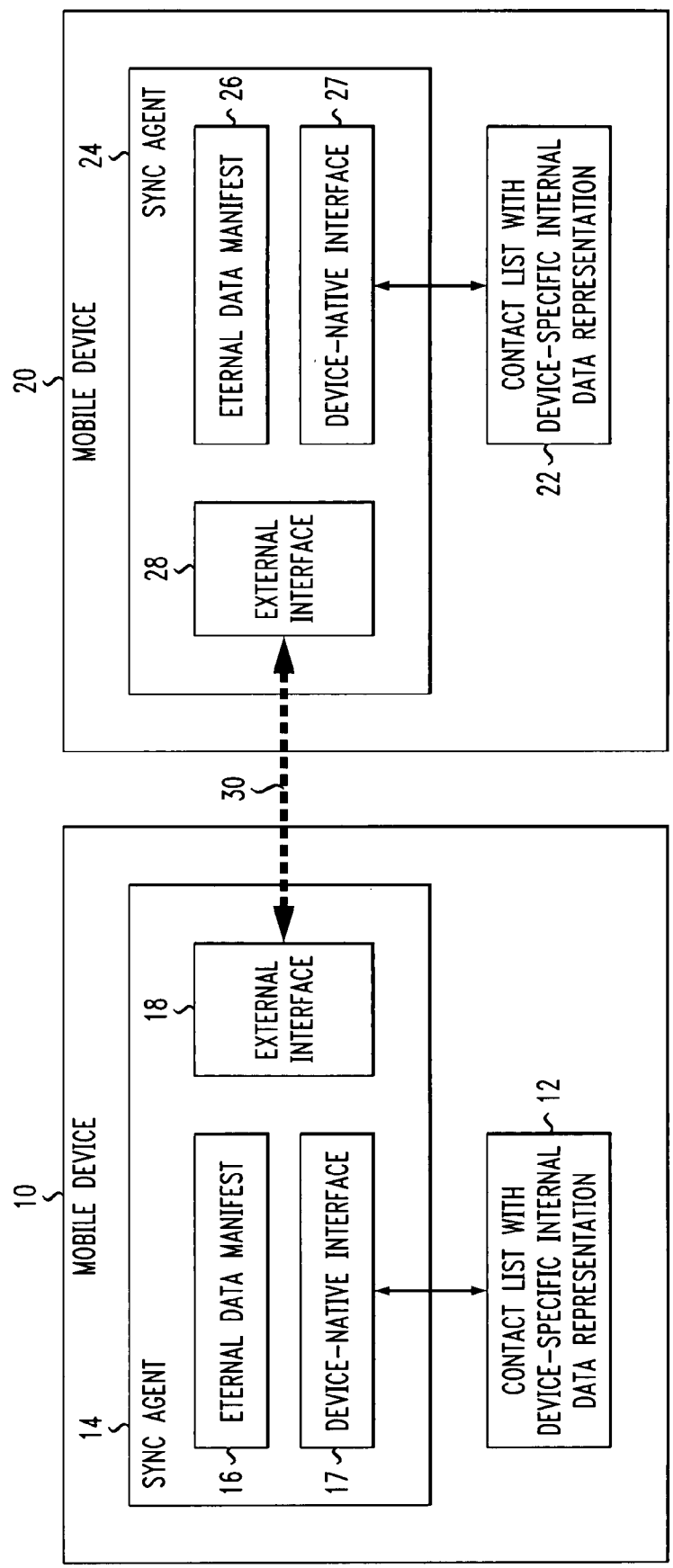
FIG. 1 is a block diagram illustrating an exemplary configuration of mobile devices suitable for practicing aspects of the present inventive subject matter.

For clarity and simplicity, the present specification shall refer to structural and/or functional elements, relevant communication standards, protocols and/or services, and other components that are commonly known in the art without further detailed explanation as to their configuration or operation except to the extent they have been modified or altered in accordance with and/or to accommodate the preferred embodiment(s) presented herein.

Generally, the present specification describes a mechanism that allows for a mobile device to associate semantics and/or meaning with stored data and defines an interface protocol that is understood and/or recognizable by other mobile devices, thereby supporting the transfer of content (e.g., contact list data) between different types and/or models of mobile devices. Suitably, a synchronization agent ("sync agent") interprets the semantics and facilitates the data transfer in accordance with a common protocol described herein.

As pointed out in the background, different types and/or models of mobile devices are commonly provisioned with contact lists or the like and the various different types and/or models of mobile devices often employ different data structures and/or different internal representations of the data contained therein. While differing types of data elements are typically supported by various different mobile devices, there is by and large a common set of data elements are used across these mobile devices and the basic data elements, e.g., contact name and contact number, generally remain inherent in each contact list. Tying these like data elements together via a common syntax for representing the element types and an associated semantics support the functionality described in the present specification.

In accordance with the present specification, the syntax and semantics of data elements stored in mobile devices is formalized so as to facilitate migration of data between mobile devices in an automated way with minimal user intervention. Suitably, this is achieved without changing the mobile device's internal representation of the data elements. Rather, an external manifestation is provided to aid migration.

With reference to FIG. 1, two mobile devices suitable for practicing aspects of the present inventive subject matter are illustrated. For purposes of the description herein, the first mobile device 10 is designated as the source or sending device and the second mobile device 20 is designated as the destination or receiving device. Suitably, the mobile devices are mobile telephones, smart phones, PDAs, or the like. As illustrated, each mobile device is equipped or otherwise provisioned in the usual manner with a contact list (12 and 22 respectively) or some other like data storage capability. As can be appreciated, for different types and/or models of mobile devices, the internal representation of the data maintained in each contact list is suitably specific to the particular mobile device.

Associated with each mobile device is a sync agent (14 and 24 respectively). Suitably, the sync agent 14 supports an external data manifest 16, a device-native interface 17 to the internal data maintained in the contact list 12 and an external interface 18. Likewise, the sync agent 24 supports an external data manifest 26, a device-native interface 27 to the internal data maintained in the contact list 22 and an external interface 28.

On one hand, each sync agent works with its corresponding external data manifest in a universal manner to facilitate data transfer between the two mobile devices, while hiding the details of the internal data representation or structure employed in their respective contact lists. On the other hand, each sync agent also works with its corresponding device-native interface to access the internal data maintained in the respective contact lists. That is to say, the sync agent of each mobile device uses their external data manifest when the mobile devices interface with one another for data migration. Suitably, a data mapping part or function internal to the sync agent is used to correlate the external and the native data formats.

Preferably, the sync agents, the device-native interfaces, external data manifests as well as external interfaces are all to be put on the devices by the device manufactures or their designated proxies or device vendors. That is to say, the agents and/or related components become part of each device, rather than an overlaid application. This is advantageous because the device manufacturers know the device-specific internal data representation that they are employing.

In a suitable embodiment, the external interface from the sync agent follows a high-speed serial bus connection as most mobile devices are compatible with USB (Universal Serial Bus) connectivity. Alternately, other physical mediums for the interface between the mobile devices are contemplated and various examples are presented later herein.

Two aspect of the present inventive subject matter will now be described. First, a common syntax for data representation in the external data manifest is set forth along with its associated semantics. This is followed by a description of an exemplary implementation outlining a protocol for the transfer of data.

Syntax/Semantics of External Data Manifest

In one exemplary embodiment, the syntax for data representation in the external data manifest follows a Lightweight Directory Access Protocol (LDAP) or LDAP-like representation in which each record in the manifest includes a distinguished name (Dn). Suitably, each record in the manifest is a collection of data elements, with each data element following a nomenclature commonly understood and/or recognized also by other mobile devices. For example, the following is a suitable text representation for the data in the manifest 16 of the sending device 10:

Dn: John Doe, Fn: John, Ln: Doe, Nn: Scooter, M1: 6143251111,
  M2: 6143542222, HT1: 6148553333, WT1: 6143674444, E1:
  johndoe@lucent.com, E2: Johndoe@yahoo.com, S:
  sip:john@lucent.com, I: John.jpg, D:1, G:1, R:5, . . . .

As can be seen in the present example, each data element is identified by a unique label or keyword ("Dn", "Fn", "Ln", etc.), followed by a colon (":"), followed by the value of the field (e.g., "John Doe"). Individual data elements are separated by commas (",").

Table 1 below illustrates an example of how the foregoing record appears in the external data manifest 16 of the sending device 10. Please note, however, that the "Meaning" column is included here for explanation purposes only; in practice, most devices would not store a verbose description of the fields in the record.

TABLE 1

Example External Manifest

| No. | Keyword | Value | Meaning |
|---|---|---|---|
| 1 | Dn | John Doe | This is the distinguished name for the record |
| 2 | Fn | John | This is the first name |
| 3 | Ln | Doe | This is the last name |
| 4 | Nn | Scooter | This is the nickname |
| 5 | M1 | 6143251111 | This is the first mobile number of the record |
| 6 | M2 | 6143542222 | This is the second mobile number of the record |
| 7 | HT1 | 6148553333 | This is the first home telephone number for John |
| 8 | WT1 | 6143674444 | This is the work telephone number for John |
| 9 | E1 | johndoe@lucent.com | John's primary email contact |
| 10 | E2 | Johndoe@yahoo.com | John's secondary email |
| 11 | S | Sip:john@lucent.com | John's SIP address |
| 12 | I | John.jpg | John's image, e.g., the type is optionally one of {.gif|.jpg|.jpeg| other} |
| 13 | D | 1 | Speed Dial entry 1 |
| 14 | G | 1 | Group entry 1 |
| 15 | R | 5 | Ringer-type 5 |
| 16 | . . . | . . . | . . . |

Similarly, for the receiving device 20, an exemplary external manifest may be more rudimentary, e.g., suitably taking the following form:

TABLE 2

Example External Manifest

| No. | Keyword |
|---|---|
| 1 | Dn |
| 2 | M1 |

Significantly, the meaning associated with Dn and M1 in Tables 1 and 2 are identical. However, Table 2 has been presented here without the meaning of the fields separately described in a column of its own since this has already been done in Table 1.

Please note that for data transfer purposes between the two mobile devices, the internal data structures of the mobile devices' respective contact lists are irrelevant insomuch as the sync agents' data mapping functions and device-native interfaces correlate the data between the external manifests and the contact lists. Rather, the external manifestation of the data is the only point of interest in this regard.

While in this example, Table 1 shows a superset of what is supported on the receiving device 20, that is not strictly the case. The object of the table is to impose a set of common keywords and their semantics across a range of various different mobile devices. In practice, not all the parameters/data elements would be represented in the table of various mobile devices. Rather, the illustrated table serves as a base table for commonly used data elements. That is to say, extensions specific to particular mobile devices are contemplated, and not all mobile devices are expected to support all types of data elements and/or the contemplated extensions.

The examples and the tables above show a canonical form for external representation of the data elements. Nevertheless, variations are possible, e.g., by extending the namespace for addressing data elements, or changing the keywords themselves (e.g., one variation of "E1" could be "EM1" or even "email1"); or by using different characters as data separators or as keyword/value separators. It is to be appreciated that these variations do not deviate from the spirit of the present inventive subject matter. However, the keywords and syntax should remain uniformly understood and/or recognized across various different mobile devices.

Data Transfer

Given that each mobile device can provide an external manifestation of the data elements via a common syntax, the data migration can now be described in two further subsections—the first, addressing a suitable protocol for the transfer of the data, and the second, addressing the physical medium over which the data is transferred.

Protocol

For this example used to illustrate the data transfer protocol, it shall be assumed that a user wants to transfer data from the contact list 12 of the first mobile device 10 to the contact list 22 of the second mobile device 20. Suitably, the transfer is a non-destructive read-out, in that the source is not destroyed after the read-out. Also, if there is prior data existing in contact list 22, that data remains intact; in other words, the contact list 12 is appended to contact list 22.

With reference now also to FIG. 2, there is illustrated an exemplary exchange of signals and/or messages over a communication link 30 (see FIG. 1) between the mobile devices 10 and 20 which is suitable for implementing a data transfer protocol in accordance with aspects of the present inventive subject matter. As illustrated in FIG. 1, the communication link 30 is established between the external interfaces 18 and 28 of the respective sync agents 14 and 24.

The exemplary protocol illustrated in FIG. 2 for effecting the data transfer is as follows:

Step 1. The user invokes the sync agents on each mobile device. That is to say, on the mobile device 20 the user identifies to the agent 24 (e.g., via an appropriate input) that it should act or otherwise operate in a "receive" mode, and on the mobile device 10 the user identifies to the agent 14 (e.g., via an appropriate input) that it should act or otherwise operate in a "send" mode. Optionally, for security purposes, both agents would request or seek a password or passcode or other like user input before accepting a user's command to send/receive data.

Step 2. The sender sync agent 14 transmits, e.g., in clear text (ASCII), its role identification to the receiver sync agent 24. Optionally, the messages and/or signals exchanged are clear text messages, e.g., ASCII (American Standard Code for Information Interchange) or the like. Suitably, the sender role identification message is optionally "TX" which is short for "transmit". If the "TX" message goes unanswered, then the sender agent 14 waits for a period of time before sending another "TX". If case several "TX" messages go unanswered, the sender agent 14 then gives up and quits or shuts down.

Step 3. Suitably, when the "TX" message is received from the sending agent 14, the receiver sync agent 24 acknowledges the role of the sender, by sending an "ACK" message or other similar signal back. On receipt of this "ACK", the sender stops sending its "TX" message. Note that in case of mis-configuration, e.g., where both devices have been incorrectly identified as sender devices, both devices start sending "TX" in step 2; suitably, this deadlock is broken by any of the devices sending a negative acknowledgment, or a "NAK", after which both devices stop sending the "TX".

Step 4. Suitably, after acknowledging the role of the sender sync agent 14, the receiver sync agent 24 further clarifies its role by sending a "RCV" message (i.e., short for "receive").

Step 5. The sender sync agent 14 acknowledges receipt of the "RCV" message by sending an "ACK" back to the receiver sync agent 24.

Step 6. At this time, the receiver sync agent 24 makes the sender sync agent 14 aware of its capacity for receiving and/or accepting data. That is to say, suitably, the receiver sync agent 24 sends a count to the sender sync agent 14 (e.g., in digits, such as "250" or some other value), to indicate its capacity for accepting data.

Step 7. Receipt of the data capacity message is acknowledged by the sender sync agent 14 sending an "ACK" message back to the receiver sync agent 24. (Note: If the sender sync agent 14 has more data records to send than the count received, the sender sync agent also alerts the user that the receiving device is not capable of storing all of the data available on 10. It should be appreciated that there can be multiple such "error" cases; however, all such cases are not described for the sake of brevity, nevertheless, in practice these "error" cases are suitably addressed in like manner.)

Step 8. At this point, the sender sync agent 14 suitably initiates sending the manifest by first sending a "MANIFEST" header.

Step 9. Receipt of the "MANIFEST" header is acknowledged by the receiver sync agent 24 sending an "ACK" message back to the sender sync agent 14.

Step 10. Now, the sender sync agent 14 sends the manifest, suitably, in a single transmission. Via a listing of the commonly recognized keywords, this message identifies which types of data elements are available for transmission from the sending device 10. Using the example above, the sender sync agent 14 sends, for example, a message which looks like:

Dn, Fn, Ln, Nn, M1, M2, . . . .

As can be appreciate, this message lists the types of data elements available from the sending mobile device 10, where the data element types are indentified using the commonly recognized and/or understood keywords designated therefor in the external data manifest 16.

Step 11. The receiver sync agent 24 responses by sending back a message listing the types of data elements it wishes to receive. Again, the data element types are indentified using the commonly recognized and/or understood keywords designated therefor in the external manifest 26. Suitably, the order in which the keywords appear in the message, indicates the order in which receiver sync agent 24 would like or expects to receive the data. Again, using the example above, the response sent by the receiver sync agent 24, is, for example, a message that looks like:

Dn, M1.

As can be appreciated, this message lists the types of data elements desired by and/or supported on the receiving mobile device 20, where the data element types are indentified using the commonly recognized and/or understood keywords designated therefor in the external data manifest 26.

Step 12. Receipt of the response is acknowledged by the sender sync agent 14 sending an "ACK" message back to the receiver sync agent 24.

Step 13. Suitably, the receiver sync agent 24 declares itself ready to receive data by sending a "DATA" message or other like signal.

Step 14. In response to receipt of the "DATA" message, the sender sync agent 14 starts sending the data, e.g., in a continuous stream. Optionally, a header such as "RESP:" (short for "response") or other like header is the first element in the data stream or otherwise precedes the actual data. Accordingly, the data stream message optionally looks as follows:

RESP: John Doe, 6143678888, Jane Doe, 6307131111, . . . , John Doe n, 6306232222. (Note that the receiving device can only accept Dn and M1, hence the sender device does not send the other fields of each of the records.)

Step 15. Once the receiver sync agent 24 has finished receiving the data stream, it sends back a count of the records received. For example, assuming 100 records were received, the receiver sync agent 24 would send "100".

Step 16. Assuming the sender sync agent 14 had sent 100 records, the sender sync agent 14 confirms the record count by sending an "ACK".

Step 17. Having now completed the data transfer, the receiver sync agent 24 disengages, e.g., by transmitting a "BYE" message of other like signal.

Step 18. Similarly, the sender sync agent 14 responds with another "BYE" to complete the disengagement of the two mobile devices 10 and 20.

Step 19. Now, the receiving sync agent 24 is free to input the received data into its internal data tables (i.e., the contact list 22) using the interface 27 and the mapping function that correlates data from the external data manifest 26 to the contact list 22. Suitably, the respective sync agents are implemented by the manufacturers of the devices or their appropriate proxies, so that translation of the external manifestation of the data into the appropriate data structure or representation used internally can readily be achieved by the respective sync agents without knowledge of the internal data representations having to be shared publicly. Moreover, certain inconsistencies between different types of internal data representation can be selectively addressed as each manufacturer sees fit. For example, if Dn uses 20 characters on the sender side, but only 15 characters on the receiver side, the receiving agent may elect to simply truncate or cut off the trailing extra characters before putting this data into the receiving side Dn. Another possibility is that the manifest itself can share the width of each field.

While in the foregoing example, the sending device 10 supports additional field in its contact list 12 as compared to the receiving device 20, this is not strictly the case in practice. On the contrary, typically when users move from one device to another, the latter device is often more modern and/or advanced. Along those lines then, in the foregoing example, the roles of the sending and receiving devices and/or the capabilities thereof may suitable be reversed.

Physical Medium

In suitably, embodiments, there are several ways to interconnect the sending and receiving devices 10 and 20. For example:

- Bluetooth is a simple wireless interfacing medium which operates over a relatively short range using radio frequency communications;
- IrDA is an infrared, line of sight, wireless interfacing medium which is useful when the devices can be kept in close proximity to one another;
- Devices that accept data cables typically employ a cable which has one end that conforms to the a device specific port or connection point and the other end conforms to a USB interface, accordingly, two devices can be interconnected via their respective data cables and a USB gender converter to connect the two USB ends of those cables;
- Each device can be hooked up via two available USB ports on a computer, with a "bridging software" operative thereon to facilitate data transfer/information exchange between the devices; or,
- Each device can be connected one at a time to a computer and via use of an appropriate agent on the computer; buffered data transfer can take place.
- Use of Short Message Service (SMS) can also be employed as a means of communication between the devices. Typical SMS messages are restricted in size, so the data transmission may optionally progress in several messages rather than one long message.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for transferring content between a first mobile device and a second mobile device, said method comprising:
   internally storing the content on the first mobile device using a first data representation for the internally stored content on the first mobile device;
   establishing a common syntax and associated semantics for describing the content among disparate mobile devices;
   creating a first external manifest on the first mobile device from the internally stored content on the first mobile, said external manifest employing the common syntax and associated semantics to describe the content;
   transferring the content from the first external manifest to a second external manifest created on the second mobile device, said second external manifest also using the common syntax and associated semantic to describe the content; and,
   internally storing the content on the second mobile device using a second data representation for the internally stored content on the second mobile device, wherein each mobile device can assume the role of a sync or a source and can communicate with each other without requiring a sync host.

2. The method of claim 1, wherein the second data representation is different from the first data representation.

3. The method of claim 1, wherein the first mobile device is one of a mobile telephone, a smart phone and a personal digital assistant, and the second mobile device is one of a mobile telephone, a smart phone and a personal digital assistant.

4. The method of claim 3, wherein the content is a contact list.

5. A method for transferring content from a first mobile device to a second mobile device, said content including a plurality of different types of data elements, each particular data element having a particular value, wherein the content is stored internally on the first mobile device using a first device-specific internal data representation and the content is stored internally on the second mobile device using a second device-specific internal data representation, said method comprising:

establishing a plurality of commonly recognized labels for identifying the different types of data elements, wherein the second data representation is different from the first data representation;

communicating from the first mobile device to the second mobile device a first list containing one or more of the commonly recognized labels, wherein the labels contained in the first list indicate which types of data elements are available for transfer from the first mobile device to the second mobile device;

communicating from the second mobile device to the first mobile device a second list containing one or more labels selected from the first list, said selected labels contained in the second list indicating which types of data elements are to be transferred from the first mobile device to the second mobile device; and, transferring from the first mobile device to the second mobile device the values of those data elements identified by the selected labels contained in the second list, wherein each mobile device can assume the role of a sync or a source and can communicate with each other without requiring a sync host.

6. The method of claim 5, wherein the first mobile device is one of a mobile telephone, a smart phone and a personal digital assistant, and the second mobile device is one of a mobile telephone, a smart phone and a personal digital assistant.

7. The method of claim 6, wherein the content is a contact list.

8. The method of claim 5, wherein the selected labels contained in the second list are listed in an order indicative of an order in which the second mobile device expects to receive the values of the data elements.

9. The method of claim 8, wherein the values of the data elements transferred from the first mobile device to the second mobile device are transferred in the order expected by the second mobile device.

10. The method of claim 9, wherein prior to the transfer of the values of the data elements, the second mobile device communicates to the first mobile device a number indicating its capacity to accept the same.

11. The method of claim 9, wherein subsequent to the transfer of the values of the data elements, the second mobile device communicates to the first mobile device a number which indicates a count of the data elements actually received.

12. A synchronization agent in a mobile device, the synchronization agent comprising:

an external data manifest, wherein each record in the manifest is a collection of data elements, with each data element following a nomenclature understood and recognized by disparate mobile devices;

a device-native interface to internal data maintained in a contact list with device-specific internal data representation, wherein the internal representation of the data maintained in the mobile device is specific to the particular mobile devices; and an external interface that facilitates a communication link and a transfer of non-uniform structures for the same type of data between the mobile device and other disparate mobile devices.

13. The synchronization agent of claim 12, wherein the first mobile device is one of a mobile telephone, a smart phone and a personal digital assistant, and the second mobile device is one of a mobile telephone, a smart phone and a personal digital assistant.

14. The synchronization agent of claim 13, wherein wherein each mobile device can assume the role of a sync or a source and can communicate with each other without requiring a sync host.

\* \* \* \* \*